United States Patent [19]

Winter

[11] Patent Number: 4,579,038
[45] Date of Patent: Apr. 1, 1986

[54] DEPTH CONTROL VALVE AND SYSTEM FOR AGRICULTURAL IMPLEMENTS

[75] Inventor: David C. Winter, Des Moines, Iowa
[73] Assignee: Deere & Company, Moline, Ill.
[21] Appl. No.: 607,070
[22] Filed: May 4, 1984
[51] Int. Cl.$^4$ .............................................. F15B 13/04
[52] U.S. Cl. ........................................... 91/30; 91/31; 91/32; 91/420; 91/443; 91/448; 91/450; 137/625.69; 172/4
[58] Field of Search .................. 91/20, 30, 31, 32, 420, 91/443, 448, 450; 137/625.69; 172/4

[56] References Cited
U.S. PATENT DOCUMENTS

| | | | |
|---|---|---|---|
| 2,755,721 | 7/1956 | Rusconi | 172/4 |
| 2,855,752 | 10/1958 | Le Brusque | 91/31 X |
| 4,120,364 | 10/1978 | Wooldridge | 172/2 |
| 4,354,555 | 10/1982 | Lang | 172/4 |

Primary Examiner—Edward K. Look
Attorney, Agent, or Firm—Henderson & Sturm

[57] ABSTRACT

Disclosed is a representative agricultural implement towed by a tractor equipped by a hydraulic power source connected to a lift mechanism for raising and lowering the implement frame so as to vary the ground-working depth of the working tools. The frame carries a sensor responsive to changes in implement depth above and below a preselected norm. This sensor serves as the input for the inventive control valve and system so as to control the implement lift system automatically. The valve is designed as a four-position valve, with one of the positions serving dual modes so that the system produces fast and slow raising, fast and slow lowering and a neutral or balanced position. The valve has a pressure port connected to the pressure side of the tractor source via a manual valve to afford three of the four active positions with one setting of the manual valve. The fourth active position (fast raise) is achieved by changing the manual valve to reverse the pressure and return ports in the depth control valve. Reversal of these ports activates a pressure chamber and pressure-receivable area on the valve spool of the depth control valve.

9 Claims, 10 Drawing Figures

DEPTH CONTROL VALVE AND SYSTEM FOR AGRICULTURAL IMPLEMENTS

BACKGROUND ART

The general area of concern of the present invention is the accurate control of the planting or tilling depth, for example, of an implement in which the planting, tilling, etc., tools are carried by a frame drawn by a tractor. The typical frame is supported on cranked axles under control of a hydraulic cylinder extended and retracted selectively according to suitable valve mechanism in response to departures of the tools from a preselected attitude or depth. The valve response may be to a ground feeler, gage wheel or equivalent sensor, and it is desirable that the response be accurate and properly sensitive. Many types of sensors and controls have been used heretofore, including hydraulic, electro-hydraulic, etc. All of these have one or more short-comings, including inaccurate response, sluggishness, complexity and short life, among others.

The principal purpose of the present invention is to provide significant improvements in a hydraulic system employing a sensor-responsive depth regulator having a four-position valve spool connected into the existing tractor hydraulic system and initially under control of a manual selective control valve operative by the tractor driver, for example. The selective control valve is movable to either of two active positions respectively at opposite sides of a neutral position and, in one of these active positions, conditions the depth regulator valve for raise and lower responses to the sensor. The depth control valve is so constructed that as a result of changing the selective control valve to its other active position, the depth control valve is capable of producing a fast-raise mode, as when raising the implement to transport.

It is a further feature of the invention to provide a system incorporating a hydraulic lockout for preventing leak-down of the lift cylinder when the implement is, for example, in transport mode. This lockout serves also as a pressure-openable check valve for enabling lowering of the implement.

A still further feature of the improved depth control valve is the association with the valve spool of a pressure-receivable chamber to which a pressure-receiving area of the valve spool is exposed. In conditions requiring fast-raise operation of the control valve, as raising of the implement to transport position, the tractor valve is actuated to reverse the pressure and return ports in the depth control valve and the chamber becomes pressurized. In the other operational mode of the depth control valve, the spool is subjected to varying spring pressures at opposite ends. In the fast-raise mode, the pressure is added to the one spring to shift the valve as required. An arrangement of this type simplifies the hydraulics and enables the depth control valve to be used with existing tractor-systems.

The invention has for a further feature provision for using the valve with either open- or closed-center hydraulic systems. In the present case, only a simple change of appropriate hydraulic control cartridges is required.

The foregoing and other features and advantages of the invention will become apparent as a preferred embodiment thereof is disclosed hereinafter.

DETAILED DESCRIPTION OF A PREFERRED EMBODIMENT OF THE INVENTION

Figure 1:
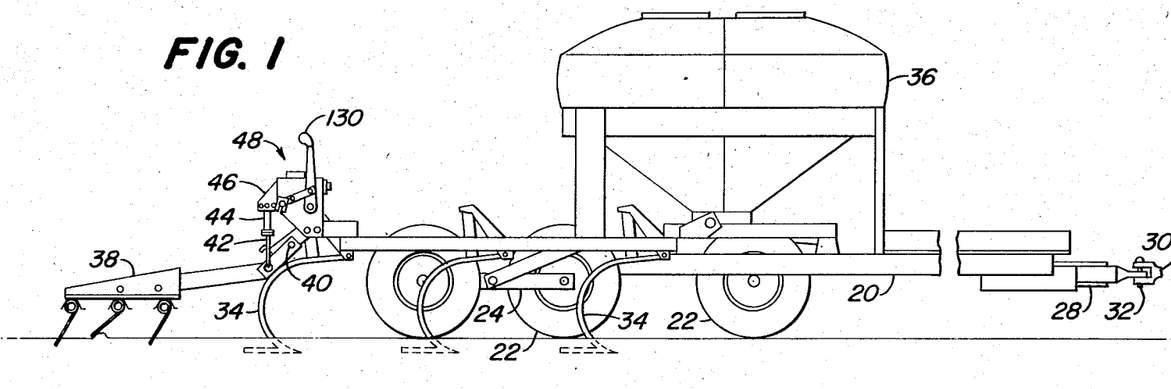
FIG. 1 is a side view of a representative-tractor-implement arrangement.

Reference is had initially to FIG. 1 for an explanation of a typical environmental arrangement in which the invention finds utility. Chosen for this purpose is an agricultural implement having a main frame (20) carried on a plurality of ground wheels (22) connected to the frame by crank axles (24) or their equivalent to provide for selective raising and lowering of the frame via hydraulic lift means including one or more two-way motors (26) (FIGS. 2–8) typically linked to the crank axles. The frame (20) extends forwardly as a draft tongue (28) connected to a tractor drawbar (30) as at (32). Since any type of typical hydraulically equipped farm tractor may be used with the instant environment, details have been omitted and the drawbar (30) will suffice to denote the presence of such tractor.

The present implement is of the fertilizer distributor type (which is not a limitation) and carries ground working tools (34) supplied from a hopper (36) mounted on the frame. Factors that affect the height of the implement frame above the ground, and thus the working depth of the tools, are so well known as to require little if any elaboration. Suffice it to say that among these are implement weight, variations in soil conditions, etc. Since accurate tilling, planting, fertilizing, etc., operations depend for success on accurate working depth of the tools, resort has heretofore been had to a variety of devices to sense change in implement height. One such sensor is illustrated here at (38) as comprising a smoother that rides the ground rearwardly of the tools and senses variations in implement height relative to a preselected norm below the transport or fully raised position or mode of the implement. The sensor is pivoted to the frame (20) at (40) and thus can rise and fall with changes in the terrain. The sensor is connected by a link (42) and spring (44) to a bell crank (46) which transmits the movement or signal of the sensor to a novel depth or height control valve designated in its entirety by the numeral (48). This will be described in detail subsequently herein. At the present it should be noted that the sensor, link and spring (44) are in series, thus affording biasing means associated with one end or side of the height control valve.

Figure 2:
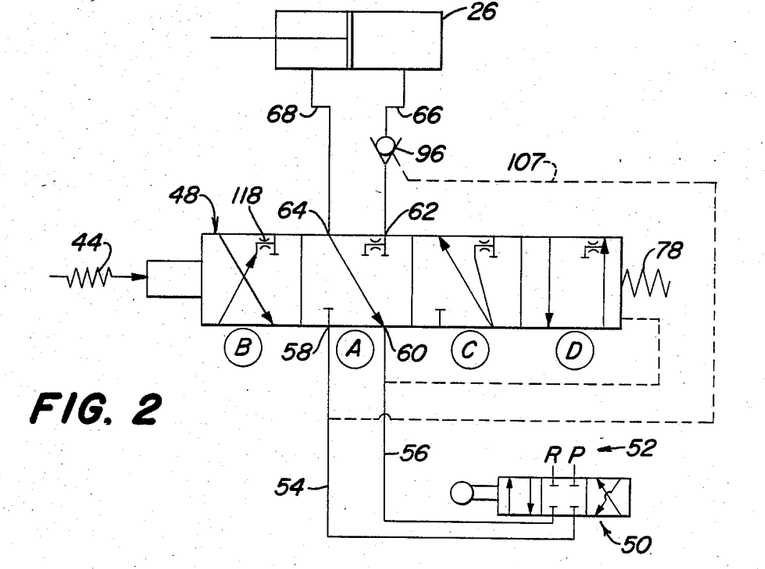
FIG. 2 is a diagrammatic illustration of the valve system shown in association with a tractor hydraulic system of the closed-center type.
Figure 3:
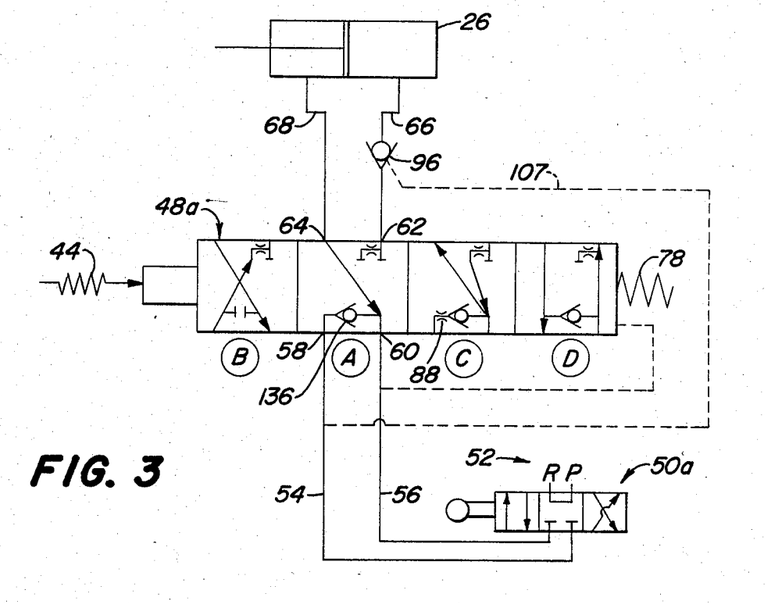
FIG. 3 is a similar diagram but modified to show use of the valve with an open-center system.

Attention is now directed to FIG. 2 for a schematic of the hydraulic motor (26), height control valve (48), a selective control valve (50) and a hydraulic power source (52), customarily integrated with the tractor. The power source is shown schematically as including a pump (P) and a reservoir (R) connected to one side of the selective control valve. The other side of this valve has fluid pressure lines (54) and (56) leading to the height control valve. In practice, these lines will be coupled to the tractor hydraulic system by typical couplers, not shown because they are of no detailed significance here. As will be seen, the selective control valve (50) has two active positions, one at each side of a neutral position. The valve is shown in its neutral position in FIG. 2 and the hydraulic system is of the closed-center type, many examples of which are known to those versed in the art. The selective control valve is here shown as being manually controlled, and, in its two active positions, is capable of switching the lines (54) and (56) between pressure and return lines. For example, when the selective control valve is shifted to the right as seen in FIG. 2, an "automatic" condition is achieved and the lines (54) and (56) become respectively pressure and return lines. (The expression "automatic" will be explained subsequently in connection with the functioning of the height control valve (48)).

As seen schematically in FIG. 2, the height control valve (48) has four positions labeled "A" (balanced or neutral); "B" (slow raise); "C" (slow lower) and "D" (fast lower/fast raise). That is to say, position "D" is a "dual" position, as will be elaborated later. The positions "A", "B" and "C" are further illustrated respectively in FIGS. 4, 5 and 6. The two "D" positions appear in FIGS. 7 (fast lower) and 8 (fast raise). The lines (54) and (56) from the selective control valve (50) lead to the height control valve (48) at ports (58) and (60), and motor ports (62) and (64) at the other side of the valve (48) lead via lines (66) and (68) to opposite ends of the motor (26), here of the two-way piston and cylinder type.

Figure 4:
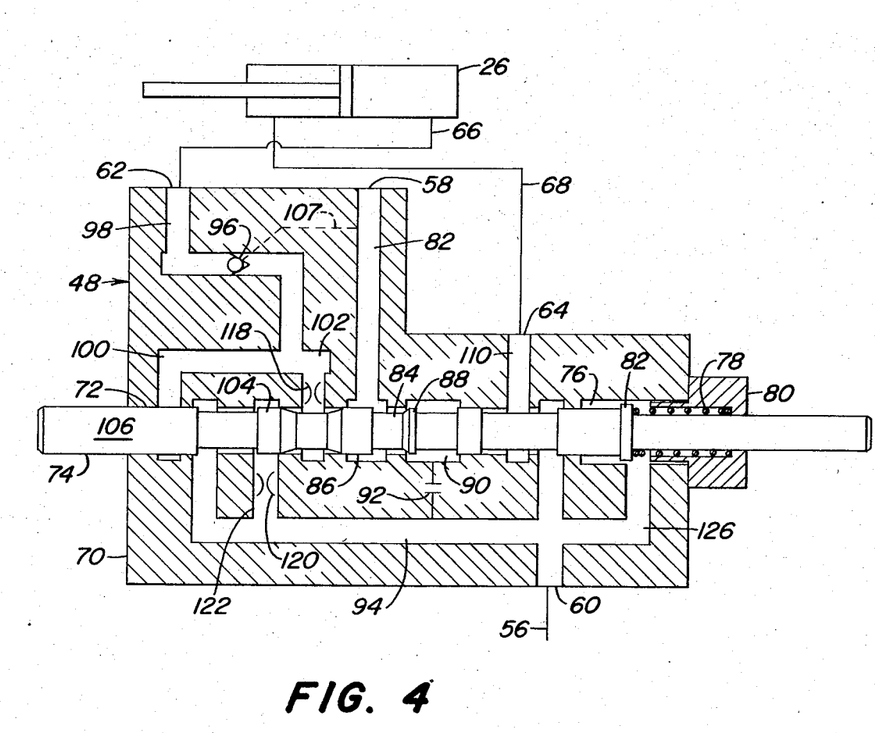
FIG. 4 is an enlarged sectional view, partly schematic, showing the depth control valve in a neutral or balanced mode and associated with a closed-center system.

In actual "hardware", the height control valve comprises a valve body (70) having a valve spool bore (72) therein in which is axially shiftably carried a valve spool (74). The spool projects at opposite ends of the valve bore and at its left-hand end (as seen by the reader) is acted on by the sensor spring and bell crank arrangment (44) and (46). The spring alone is shown in FIG. 2 and, in the interests of simplicity, that spring will be regarded as imported into FIGS. 4 through 8 to represent biasing means acting on that end portion of the valve spool exposed at the left end of the valve body (70), or in such direction as to cause the spool to move to the right. At the opposite side of the valve body and at the opposite or right-hand end portion of the valve spool, the body is provided with a chamber (76) which houses a second biasing means in the form of a coiled compression spring (78). An outer closure (80) is affixed to the body to complete the enclosure of the spring (78). This spring abuts an annular shoulder (82) formed on the valve spool and functions to bias the spool to the left or in opposition to the force of the left-hand spring (44). In a selected condition of operation of the implement (implement at a preselected height), the two biasing means will counteract each other and the neutral position of the valve spool will obtain (FIG. 4). As will be seen, variations in implement height will effect shifting of the valve spool, depending upon the direction of height change.

The valve body is formed with internal passage means leading from the pressure and return ports (58) and (60) to the motor ports (62) and (64) via the valve spool bore and the valve spool has lands and grooves for connecting and disconnecting the passage means to accomplish the raise and lower positions outlined heretofore herein. The port (58), which acts as the pressure port in the "automatic" phase of the selective control valve (50) (that valve shifted to the right of the neutral position shown in FIG. 2), leads via a valve body passage to the valve bore, at which point the valve spool has a groove (84) between a pair of lands (86) and (88) which, in the FIG. 4 position of the spool, connects the passage (82) to a chamber (90) which is blocked off at (92) from an elongated return passage (94) that leads to the return port (60) and thence via the line (56) to the return side of the "automatic"-positioned selective control valve (50). That the blockage occurs at (92) is immaterial in a closed-center system and its presence is indicated only because the invention makes provision for replacing the blockage with a communication, as will appear later. At this stage of the operation, no change is made in the status of the components. The motor (26) is locked against lowering by means of a check valve (96) in a motor line (98) leading to the motor port (62) from the valve spool bore from two branches (100) and (102), but both are blocked off from return to the passage (94) by suitable lands (104) and (106) on the valve spool. The check valve (96) opens in response to pressure rise in the line (82) via a branch passage (107), shown here in dotted lines as a schematic representation.

Figure 5:
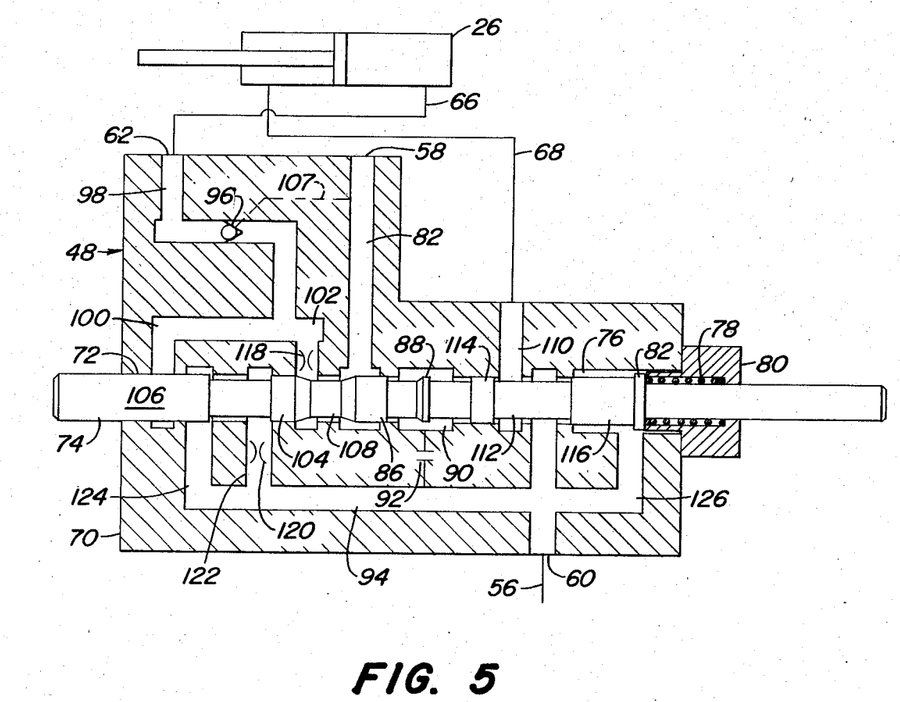
FIG. 5 shows the valve of FIG. 4 in its slow raise mode.
Figure 6:
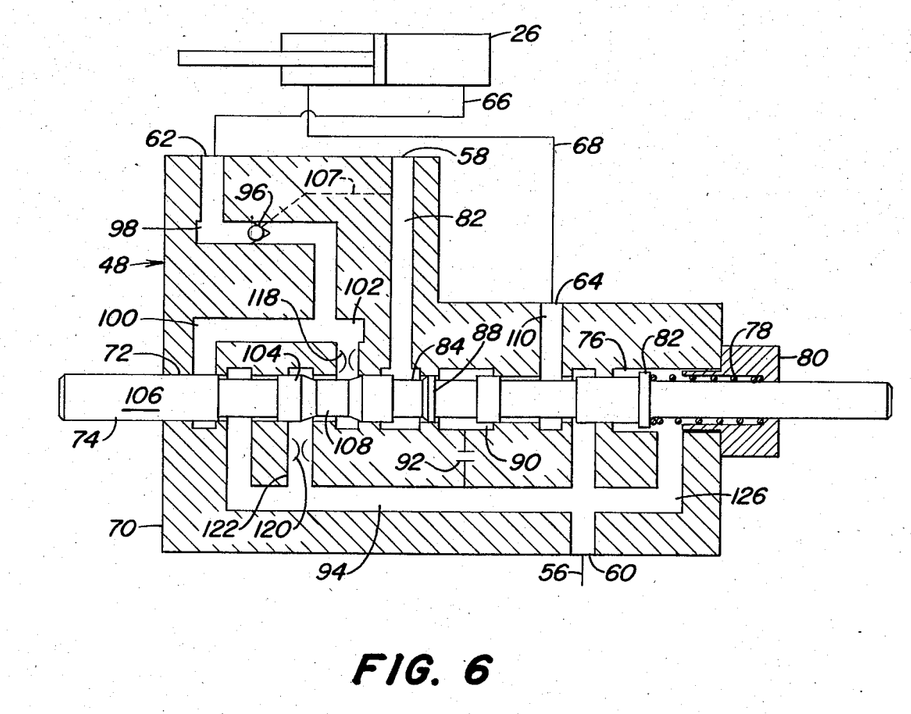
FIG. 6 shows the above valve in its slow lower mode.
Figure 7:
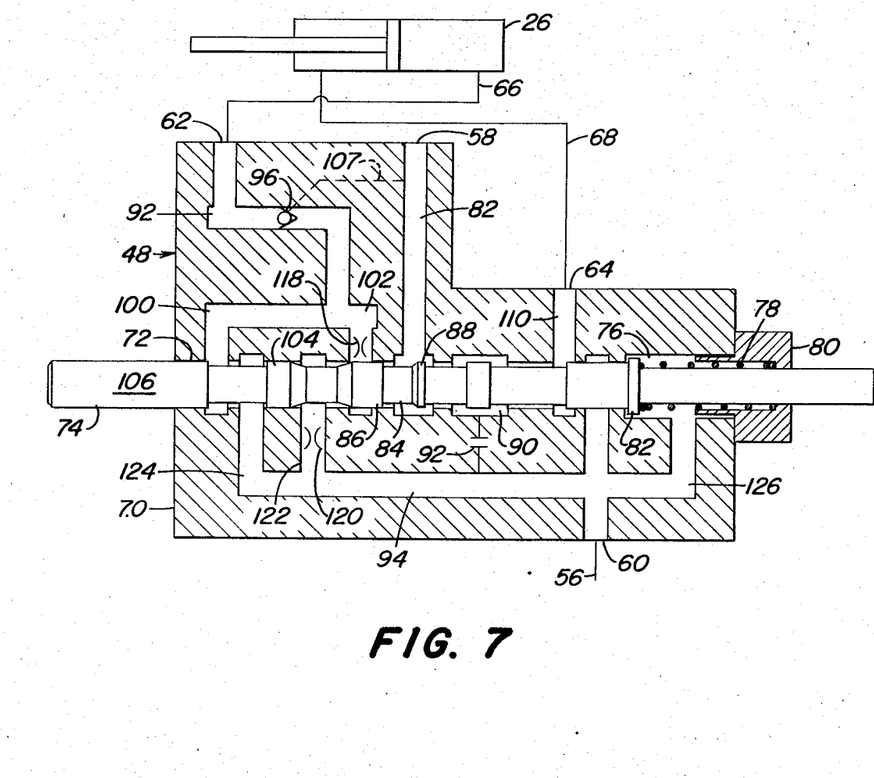
FIG. 7 shows the above in its fast lower mode.
Figure 8:
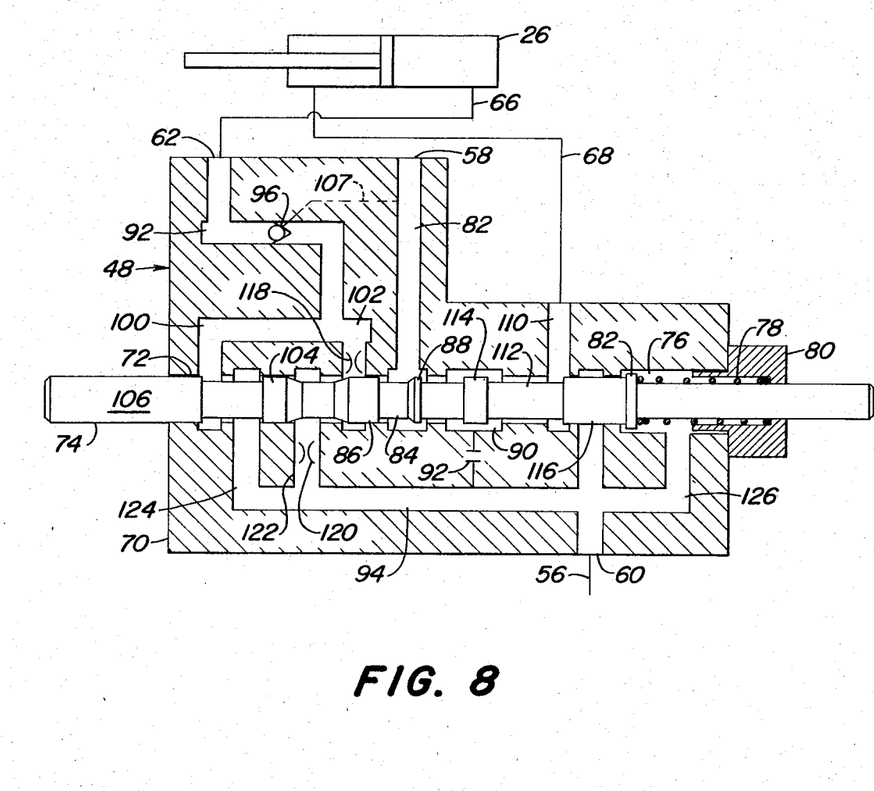
FIG. 8 shows the fast raise mode.

FIG. 5 (Position "B" in FIG. 2) shows the shift in the valve spool to the right in response to increase in force as applied by the sensor as the implement tends to lower as respects its selected norm. The lowering moves the sensor link and compresses the sensor spring (44), thus applying the necessary force on the spool. The situation acquires a raise of the implement back to the selected norm and, as the spool shifts to the FIG. 5 position, a valve groove (108) between the lands (86) and (104) leads the pressure passage (82) to the branch (102) and thence past the check valve (96) to the motor port and thence to the piston side of the motor (26), extending the motor to raise. The rod side of the piston is returned to reservoir via the line (68), motor port (64) and offset passage (110) to the return passage (94) because of a valve spool groove (112) between a pair of lands (114) and (116). Slow raising of the implement is effected here, as desired, by means of a restriction or orifice (118) in the passage (102). The schematic showing represents typical screw-in orifices that can be varied as to size to change the raise and lower rate as desired. The same applies to another orifice (120) in a branch passage (122) that is one of a pair including a second branch (124) from the return passage (94) to the valve bore and controlled by the valve lands (104) and (106). When the implement reattains its original elevation, the valve spool returns to neutral or balance position. See FIG. 4.

When operating conditions are such that the sensor senses an increase elevation of the implement from its selected operating height, the force on the sensor spring (44) decreases and the spring force at (78) results in a shift of the spool to the left. See FIG. 6. This change in condition requires a lowering of the implement to its selected height and consequently the piston side of the motor (26) must be connected to return. In closed-center operation, because of pressure in passage (82), the check valve (96) is open, connecting passage (98) to return passage (94) via passage portions (100), (102) and (122). At this time both orifices (118) and (120) are effective to retard lowering of the implement. As will be seen, the spool groove (108) interconnects the passage portions 102 and (122) and the land (106) blocks the branch passage (100), thus effectuating the orifices.

The valve operations so far described have been at a relative slow rate, consistent with responsive implement raising and lowering, so as to avoid sudden and large increments of movement. There are times, however, when faster operation is required or at least desired; e.g., raising and lowering the implement to and from transport position. For both of these operations or modes, the invention provides a fourth position for the height control valve (48), and this position serves both fast lower and fast raise functions.

When the implement is in transport, its tools will be clear of the ground and the sensor, out of contact with the ground, will not apply force to the valve spool (74). Thus the opposite end spring (78) will shift the spool to the left to the position of FIG. 7. Again, pressure will open the check valve (96) and return from the full piston side of the motor leads to the passage (94), by-passing both orifices (118) and (124) through the by-pass afforded by the passage (100) and the spool groove between the lands (104) and (106). At the same time pressure is available to the rod end of the piston via the passages (82) and (110) past the land (88), chamber (90) and spool groove (112). The lowering of the implement at a rapid rate is interrupted as soon as ground contact is made by the sensor, which begins to apply force to the left-hand spring (44), so the descent of the implement ultimately will be at a slower rate, as the spool is compelled to seek its FIG. 6 position.

Operation of the control, to the extent so far described, has been achieved with the selective control valve (50) in its "automatic" position; that is, shifted to the right as seen in FIG. 2. When fast-raise mode is to be effected, the valve (50) must be shifted to the left of its neutral position. This reverses the lines (54) and (56) as to pressure and return and the line (56) becomes the pressure line and line (54) the return line. The ports (58) and (60) in the height control valve body (70) are also reversed, the port (60) becoming the pressure port and vice versa. This means that the elongated passage (94) in the valve body is now subject to pressure. Significant in this respect is the communication of the passage (94) with the fluid chamber (76) at the right-hand end portion of the valve spool, which communication is made by a short of branch passage. Although this communication is present in all positions of the valve spool, it is only in the fast raise mode that it becomes effective, since at this time the chamber is fluid-pressurized, and the spool end portion has a pressure-receivable area (128) on which this pressure acts to add to the force of the spring (78) and thus to overcome the spring (44). The increased area at (128) results from a greater spool diameter at the land (116) than other pressure-exposed areas of the spool. In the fast raise position, the spool occupies the same status as the spool did in the fast lower position, except that the pressure and return passages are reversed. Thus, pressure is applied to the piston side of the motor free of the restrictions or orifices in the passage means. Likewise, return is free from restrictions (via (68), (64), (110), groove (112), chamber (90), spool groove between the lands (88) and (114) and passage (82) and ultimately to reservoir).

In order to change the selected working position of the tools to a different pre-selected position, any suitable means may be provided, several of which are known and need not be described in detail. For example, adjustments may be made in the length of the sensor-to-bell crank linkage (44-46). The pivot of the bell crank may be re-located; or the pivot (40) may be chanced. As representative of such means, a handle (130) is provided for manual selection. This could, of course, be replaced with any suitable remote control operative from the tractor.

Figure 9:
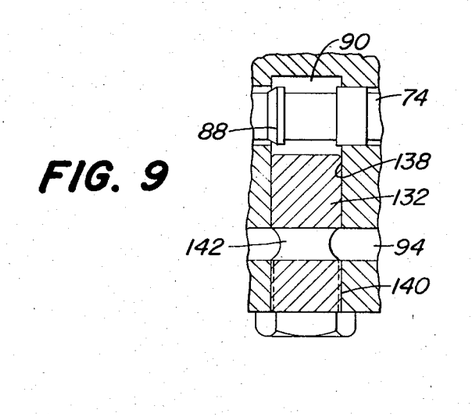
FIG. 9 is an enlarged fragmentary view, partly in section, showing the use of a "plug" cartridge in the depth valve during closed-center-system operation.

Up to this point, the description has proceeded on the basis of the use of the control valve with a closed-center system (FIG. 2), and the valve body (70) has a blockage at (92). As stated earlier, the means (92) need not be provided if the use of the control valve were confined to a closed-center system. However, it is a feature of the invention to increase the flexibility and versatility of the valve and hence provision has been made for alternate use of passage-control means such as cartridges (132) and (134), the former a plug and the latter including a check valve (136) operable toward the passage (94). To facilitate alternate use of these, the valve body (70) has a bore or passage (138) that opens outwardly as a tapped bore (140) and that internally intersects the valve spool bore (74) at the chamber (90). Thus, either cartridge may be screwed into or out of the valve body. In FIG. 9, the plug is shown as having a cross bore (142) which registers with the passage (94). Otherwise, the plug blocks off the valve spool bore, resulting in the blockage previously referred to at (92).

Figure 10:
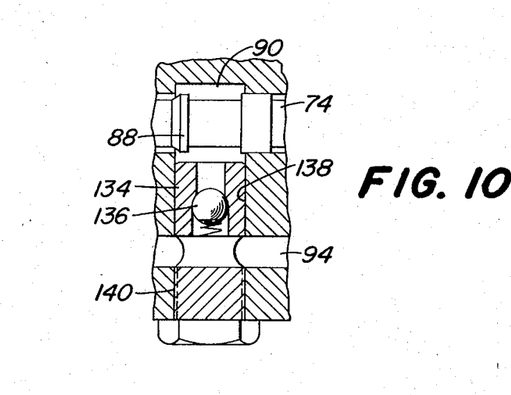
FIG. 10 is a similar view but showing the use of a check valve cartridge for use in the open-center system.

In the open-center status (FIGS. 3 and 10), a communication, albeit restricted, is required between the valve bore and the passage (94) because of the nature of the open-center system. A further aspect at this point is that the land (88) is made with a somewhat smaller diameter than the associated portion of the valve bore. This is for the purpose of providing a throttling effect in the FIG. 6 position in open-center operation so as to enable a pressure build-up sufficient to open the check valve (96).

It is believed that the operation of the controls in the open-center phase will be clear. Obviously, the selective control valve will be different from that shown at (50) and is thus designated (50a). The control valve (48) is also different as respects the throttling function at (88-90) and the check valve (136) and hence is designated (48a). The other components are alike in both systems and it is felt unnecessary to apply reference numerals to all parts common to both systems.

It will have been demonstrated from the foregoing that new and useful controls have been provided for the environment described. As pointed out, the improvements can be easily applied to existing systems. The nature of the control valve is such that constant flow of hydraulic fluid, even at a low rate, is not required to maintain system equilibrium. These and other features and advantages of the invention will become apparent to those versed in the art, as will many modifications and alterations to the preferred embodiments disclosed.

I claim:

1. A hydraulic control system for use with a tractor-associated agricultural implement selectively raised and lowered between transport and working modes by two-way hydraulic lift means including a motor, and wherein the implement includes a sensor operative to sense variations in implement height relative to a predetermined norm lower than the transport mode and the tractor has a hydraulic power source under control of a selective control valve having selectively serviceable pressure and return connections, comprising: a valve body having a valve spool bore, a pair of motor ports adapted for connection to the lift means motor, pressure and return ports adapted for connection to the respective selective control valve connections, passage means connecting the ports to the valve bore, and a valve spool axially shiftable in the bore to control connection and disconnection among the ports and valve bore, first biasing means interposed between the sensor and one end portion of the spool and stressed by the sensor to shift the spool in one direction to a raise position responsive to decrease in implement height, second biasing means acting on the opposite end portion of the spool and biasing the spool in the opposite direction to a first lower position in response to relatively small increases in implement height below the transport mode, said two biasing means being normally operative to balance each other to achieve a neutral position of the spool intermediate the aforesaid two positions in response to attainment by the implement of the predetermined height, said second biasing means being operative, when the implement is elevated to transport mode, and consequent decay in the force of the first biasing means, to shift the spool to a second lower position axially beyond the first lower position, said passage means including a restriction effective in the first lower position of the spool so as to retard implement lowering, and said passage means further including a by-pass around said restriction effective in the second lower position of the spool so as to accelerate implement lowering.

2. The hydraulic control system of claim 1, including a check valve in the portion of the passage means leading to one motor port, said check valve being operative to close in the direction of the valve bore, and said passage means including a branch leading to the check valve and operative when pressurized to open the check valve to enable exhaust of the motor when the valve spool is in either of its lower positions.

3. The hydraulic control system of claim 1, in which the restriction is also effective in the raise position of the spool.

4. The hydraulic control system of claim 1, in which the valve body includes a chamber at the end portion of the spool adjacent to the second biasing means, the valve spool has a pressure-receivable area exposed to the chamber, and the valve body includes a branch passage communicating the chamber with the return port whereby, when the return connections at the selector valve are reversed, the chamber is pressurized to overcome the first biasing means and thus to shift the spool to the status of the second lower position, the passage means then becoming effective to achieve a second raise condition in which the restriction is by-passed and the implement is raised relatively rapidly.

5. The hydraulic control system of claim 4, in which the chamber encloses the second biasing means.

6. The hydraulic control system of claim 1, in which the valve body includes an auxiliary passage connecting the valve bore and the return port downstream of the bore when the spool is in its first lower position, said passage has an opening exposed exteriorly of the valve body, and auxiliary-passage-control means is received by the passage via said opening.

7. The hydraulic control system of claim 6, in which the auxiliary passage control means includes a plug blocking the passage against communication between the bore and the return port when the selective control valve is of the closed-center type.

8. The hydraulic control system of claim 6, in which the auxiliary passage control means includes a check valve operable downstream from the bore to the return port and vice versa when the selective control valve is of the open-center type.

9. The hydraulic control system of claim 8 including a pressure-operable check valve in the passage means portion leading from one motor port to that portion of the valve bore in communication with the auxiliary passage, and the valve spool and valve bore upstream of the auxiliary passage combine to produce a restriction enabling pressure build-up in the passage means effective to open the check valve in the first lower position of the spool.

* * * * *